United States Patent [19]

Petersson et al.

[11] Patent Number: 5,397,380
[45] Date of Patent: Mar. 14, 1995

[54] METHOD FOR PROCESSING COMPLEX METAL SULPHIDE MATERIALS

[75] Inventors: Stig A. Petersson, Skelleftehamn; Åke Sandström, Luleå, both of Sweden

[73] Assignee: Boliden Mineral AB, Boliden, Sweden

[21] Appl. No.: 137,084

[22] PCT Filed: Jun. 17, 1992

[86] PCT No.: PCT/SE92/00434

§ 371 Date: Oct. 21, 1993

§ 102(e) Date: Oct. 21, 1993

[87] PCT Pub. No.: WO92/22673

PCT Pub. Date: Dec. 23, 1992

[30] Foreign Application Priority Data

Jun. 19, 1991 [SE] Sweden .................... 9101893

[51] Int. Cl.⁶ .................... C22B 1/11; C22B 3/04
[52] U.S. Cl. .................................... 75/743
[58] Field of Search ............................ 75/743

[56] References Cited

U.S. PATENT DOCUMENTS

| | | | |
|---|---|---|---|
| 3,293,027 | 12/1966 | Mackiw | 75/743 |
| 3,954,450 | 5/1976 | Kuhn | 75/743 |
| 4,362,607 | 12/1982 | Ritcey | 75/743 |
| 5,232,491 | 8/1993 | Corrans | 75/743 |
| 5,246,486 | 9/1993 | Brierley | 75/743 |

FOREIGN PATENT DOCUMENTS

| | | |
|---|---|---|
| 11201/92 | 2/1992 | Australia . |
| 113649 | 7/1984 | European Pat. Off. . |
| WO92/16667 | 10/1992 | WIPO . |

*Primary Examiner*—Peter D. Rosenberg
*Attorney, Agent, or Firm*—Burns, Doane, Swecker & Mathis

[57] ABSTRACT

A process for the treatment of complex metal sulphide materials and for the recovery of metal values from such materials. The process involves first subjecting the material to a leaching process under conditions such that sulphide-sulphur is oxidized to sulphate and such that oxidized iron and impurities such as As will pass into solution, whereafter the leaching residue is melted for conventional pyrometallurgical recovery of the metal values.

Different embodiments of the process provide for the recovery of precious metal values from refractory materials containing such values and for the recovery of metal from complex copper concentrate and complex nickel concentrate.

22 Claims, No Drawings

METHOD FOR PROCESSING COMPLEX METAL SULPHIDE MATERIALS

BACKGROUND OF THE INVENTION

1. Field of the Invention

The present invention relates to a process for recovering metal values from metal sulphide materials, and particularly from refractory materials, complex copper concentrates and nickel concentrates that contain precious metals.

2. Description of the Related Art

Sulphide material can be processed totally hydrometallurgically, for instance by means of a combination of leaching stages and a subsequent stage in which the leached metal values are recovered with the aid of such methods as liquid extraction, chemical precipitation or electrolysis (electrowinning). Leaching of sulphides can be carried out with oxidizing solvents, such as iron(III)sulphate. A leaching process of this kind, however, is extremely slow and requires considerable space, and is therefore preferably performed outdoors. The sulphides may also be leached subsequent to roasting the sulphides, which converts the valuable metal content to forms which are more readily dissolved and which can be carried out, for instance, in the form of a sulphating or chlorinating roasting process. Sulphide material can also be leached directly with atmospheric oxygen or an oxidation agent, for instance in a sulphuric acid environment under high temperature. A leaching process of this nature must therefore be carried out at elevated pressure in an autoclave. Two reactions occur when pressure leaching in a sulphuric acid environment, these being:

$$MeS + 2O_2 \rightarrow MeSO_4 \quad (1)$$

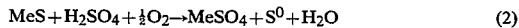

$$MeS + H_2SO_4 + \tfrac{1}{2}O_2 \rightarrow MeSO_4 + S^0 + H_2O \quad (2)$$

of which reactions the reaction (1) is encouraged by high temperatures, It is not normally possible to avoid reaction (2), and consequently the leaching product will contain elemental sulphur ($S^0$), which is liable to complicate both the leaching process concerned and also continued leaching of the leaching residue, due to inactivation of the surface of the leached material by precipitated sulphur. Pressure leaching has not been used industrially to any appreciable extent, because of the problems indicated above.

Leaching of sulphidic material with atmospheric oxygen can also be carried out in the presence of bacteria as "catalyzing" auxiliaries. In general, these bacteria are comprised of Thiobacillus Ferrooxidans, which encourage the oxidation of both sulphur and iron. Bacteria-based leaching processes are normally carried out with the intention of recovering metals according to one of the following alternatives, both of which are applied on an operational scale in many places in the world.

1. Leaching with the intention of leaching out valuable metals, which are then recovered selectively from the leaching solution with the aid of conventional hydrometallurgical methods. Examples: copper, nickel, cobalt, uranium, zinc.

2. Leaching of so-called refractory minerals that contain precious metals (such as pyrite and arsenopyrite) so as to free the precious metals, which are then extracted from the leaching residue (e.g. cyanide leaching) by means of conventional hydrometallurgical methods.

Bacteria leaching affords certain advantages over pressure leaching, among other things because the bacteria encourage or favour oxidation of both sulphide sulphur and elemental sulphur to sulphate. The oxidation of Fe(II) to FE(III) is also encouraged. The bacteria-leached material can therefore be subjected to further leaching, e.g. with cyanide, to recover precious metals from the first leaching residue, without risk of problems caused by elementary sulphur. One serious drawback, however, is that bacteria leaching requires very long leaching times in order to achieve sufficiently high metal yields. This will be exemplified in the following with reference to the recovery, or winning, of precious metals from so-called refractory materials, although the problem applies generally to the majority of the sulphide materials in question.

Precious metals, particularly gold, are often present in the form of submicroscopic grains embedded in "host minerals" such as pyrite and arsenopyrite. Hydrometallurgical recovery of precious metals from these materials is attractive in most cases, and is preferred to pyrometallurgical processes, which, from a technical and economical aspect, are only conceivable when the material has high precious metal contents and low impurity contents (arsenic, antimony, etc.). It is not possible, however, to recover the precious metal content of such materials directly by conventional extraction with cyanide or thiocarbamide, since the precious metals are not accessible to the chemical reagents. The material, i.e. the ore or the concentrate, must therefore be "loosened" to free the precious metal grains prior to the extraction process. This loosening process is carried out by means of an oxidation process, which can be effected by roasting, pressure-leaching or bacteria-leaching the material concerned, as discussed in the introduction. The precious metals can then be extracted in a conventional manner, by cyanidation.

When the material-loosening oxidation process is effected by leaching, the precious metals are freed while, at the same time, the iron, sulphur and arsenic present sink as a result of oxidation and dissolution. Thus, since these elements take-up a dominating part of the original material, the concentration of the precious metals present in the residue will rise in proportion thereto. One serious problem with the cyanide extraction of precious metals from refractory materials is that the oxidation process must be relatively complete in order to achieve a satisfactory precious metal yield, since remaining non-oxidized sulphide mineral will contain unaccessible precious metals. Total oxidation of sulphide concentrate is both time-consuming and costly, both when effected in an autoclave and when effected with bacteria, which greatly restricts the usefulness of this pre-treatment process, both technically and economically. Thus, the only alternative that remains is roasting, despite all of the obvious environmental disadvantages manifested with such oxidation processes, for instance such drawbacks as the need to effectively clean the flue gases and to treat the dust generated, where requirements can be as high as 99% and even higher with regard to sulphur purification. Quantitatively, the resultant roasted product will have generally the same size as the input material, since the iron remains in the roasted product and oxygen takes the place of the sulphur that is roasted off.

SUMMARY OF THE INVENTION

One object of the present invention is to provide a method for recovering metal values from sulphide material without suffering the drawbacks aforedescribed and a method which can be used generally for processing metal sulphide materials. Among the advantages afforded by the invention is that roasting as an oxidation treatment process is replaced by a leaching treatment process which need not necessarily be effected to a state of full oxidation.

To this end, the invention is characterized by the process steps set forth in the respective process claims. Thus, according to one aspect of the invention, all metal sulphide material to be treated is subjected to a leaching process under conditions such that the sulphide sulphur present will be oxidized to sulphate and such that oxidized iron will pass into solution together with such impurities as arsenic and antimony. The resultant leaching residue is then melted to recover the metal values by conventional processes. Leaching of the metal sulphide material can be effected in a sulphuric acid environment in an autoclave, preferably at a high temperature, and therewith at a necessarily elevated pressure as to suppress the formation of sulphide sulphur to the greatest extent possible. It is preferred, however, to carry out the leaching process in the presence of bacteria capable of encouraging the oxidation of sulphur and iron at temperatures as low as 25°–37° C., which are the most favourable conditions, and a pH-value of about 1–2.

Preferably, the leaching process will be carried out over a period of time so restricted that at most 80%, preferably 75–80%, of the sulphide-sulphur content will be oxidized. The first 75–80% of the sulphide content of the material is oxidized relatively quickly and simply by bacteria leaching, whereas the remainder of the sulphide content is oxidized much more slowly and requires higher capacity, and therewith, of course, is more costly. With an oxidation degree of 75–80%, however, practically all of the arsenic present and the major part of the iron and sulphur present will have been oxidized and released from the material, thereby considerably reducing the quantity of material that remains and thereby enabling the subsequent melting stage to be carried out relatively easily and at lower cost than would otherwise be the case, for instance when oxidizing the material by roasting.

In some cases, the valuable metal content of the sulphide materials can be oxidized and leached at least partially during the leaching process. Such metals are therefore precipitated from the leaching solution, for instance by cementation, and are isolated and processed pyrometallurgically together with the leaching residue. This may be relevant when processing complex copper concentrate, by which is meant in this context copper-containing concentrate having a varying precious metal content and including impurities such as arsenic, antimony, etc. Generally, it is not possible to melt such material directly without previously roasting the material, in view of the impurities or contaminants contained therein. Thus, an advantage is afforded when such concentrates are pre-processed with an inventive leaching process with the intention of reducing the arsenic, antimony and sulphur content of the materials. Copper will pass partially into solution in the leaching process, but can be easily recovered and worked-up pyrometallurgically together with the leaching residue. Complex nickel concentrate can also be processed in this way. By complex nickel concentrate is meant here primarily copper-containing and magnetite-containing pentlandite concentrate containing 5–10% Ni, a few percent of copper and 30–40% Fe and 30–40% S. During the leaching process, nickel, iron and copper pass into solution as sulphates. By neutralizing with lime or limestone, the iron is precipitated as jarosite or goethite and sulphur and gypsum. Copper end nickel can then be precipitated as sulphide, oxides or metals (cementation) and melted together with the leaching residue in the same way as that described above with regard to copper concentrate. Other complex concentrates can also be processed by the inventive process, for instance Zn—Pb—Cu—Ag concentrate or Cu—Pb precious metal concentrate.

The leaching residues and any material that is precipitated can be used suitably as melt material, together with melt material from other origin sources in a conventional copper smelting process.

The invention will now be described in more detail with reference to a number of typical exemplifying embodiments, of which Example 1 describes test conditions, etc., and Examples 2 and 3 describe typical results and experiences encountered when processing a number of different materials.

EXAMPLE 1

A leaching test was carried out on both a bench and a pilot scale. In the case of the bench tests, the apparatus used were a 40-liter pulp preparation tank and three reactors connected in series, of which the first reactor had a volumetric capacity of 10 liters and the remaining two reactors a volumetric capacity of 5 liters. Pulp and leaching solution were pumped semi-continuously between the tanks. Each reactor was equipped with a pH-electrode and a redox electrode. A propeller was immersed in the reactors and air was injected beneath the propeller in an amount corresponding to about 0.4 liter/liter of leaching solution. The reactors were immersed in a water bath equipped with a thermostat. The conditions under which the bench tests were carried out were as follows:

Temperature: 35° C.
pH in reactor 1 and 2: 1.6
Air addition corresponding to an amount of dissolved $O_2 > 1$ mg/l
Air enriched with 1% $CO_2$
Bacteria: Thiobacillus Ferrooxidans
Residence time (h): 160 and 240 respectively
Particle size $k_{90}$ ($\mu$m): 38 and 53 respectively
Pulp consistency % (w/w): 10 and 13 respectively In a leaching test carried out with a refractory concentrate containing 72% $FeS_2$ and 17% FeAsS, it was found that the yields of FeAsS were relatively independent of the varying conditions, whereas $FeS_2$ was oxidized and leached similarly at short residence times, although the yield is higher at lower pulp concentrations and at a longer residence time. The degrees of oxidation achieved were about 78% at the shorter leaching time and 85% at the longer leaching time with a respective pulp consistency of 13% and 10%.

The pilot tests were carried out, in principle, with the same array of test equipment, although at a size which was 100 times greater than the sizes used in the bench tests. The pilot plant was also equipped with a thickener for thickening output and leaching residue, from which the solution was permitted to run over to a 500 l neutralization tank. Connected downstream of the neutralization tank was a further thickener, in which precipitate was separated from the outgoing process water. The reactors were equipped with agitator turbines and air enriched with 0.5% $CO_2$ was delivered to the reactors beneath the agitators in an amount corresponding to 0.1 l/l leaching solution. A test material containing 64% $FeS_2$ and 20% FeAsS was leached in the pilot tests.

The conditions prevailing in these tests were essentially the same as the aforesaid conditions, although further tests were made with pulp having a 15% solids content, over a residence time of 160 hours.

A comparison between the two test series carried out on a bench scale and a pilot scale respectively show generally the same results with regard to yields and degrees of oxidation. An increase in pulp consistency from 10 to 15% at a leaching time of 160 h requires an increase in the amount of input concentrate from 16.3 kg/m³ per calendar day to 25.5 kg/m³ per calendar day, although the leaching yields were roughly the same despite this considerable increase.

EXAMPLE 2

A gold-containing refractory concentrate containing 30 g Au/tonne was processed. The concentrate comprised pyrite and arsenopyrite. The concentrate had a pyrite ($FeS_2$) content of 70% and an arsenopyrite (AsFeS) content of 20%. The remainder consisted of gangue, mainly $SiO_2$. The gold was distributed generally uniformly in the pyrite and in the arsenopyrite. This meant that it was necessary to loosen (oxidize) both the arsenopyrite and the pyrite in order to achieve a satisfactory gold yield. As will be seen from the results set forth in the following Table 1, when cyanidizing, the gold yield increased with the degree of oxidation.

TABLE 1

The gold yields obtained when cyanidizing at varying degrees of oxidation

| Oxidation degree % | Yield Au % |
|---|---|
| 30 | 35 |
| 50 | 55 |
| 75 | 75 |
| 95 | 90 |
| 99 | 95 |

As will be seen from Table 1, a high degree of oxidation (>95%) is necessary in order to obtain an acceptable gold yield. Table 2 below, however, shows that the leaching time must be at least 5 times longer in order to achieve a 95% degree of oxidation in comparison with the case when an oxidation degree of only 75% is considered satisfactory.

TABLE 2

Degree of oxidation at varying leaching times

| Leaching time h | Oxidation degree % |
|---|---|
| 25 | 45 |
| 50 | 60 |
| 100 | 80 |
| 150 | 90 |
| 200 | 96 |

Due to a higher electrode potential, pyrite is not as readily oxidized as arsenopyrite. Consequently, the arsenopyrite is oxidized before the pyrite, which means that arsenic can be leached from the material and eliminated relatively quickly.

A 75-percent degree of oxidation, however, will only result in roughly a 75% gold yield when cyanidizing the leaching residue, which is unacceptable. At a 75% degree of oxidation, the weight of the concentrate has been reduced by about 70%, i.e. a leaching residue of only 0.3 tonne is obtained from one tonne of concentrate. The gold content has increased from 30 g/t to 100 g/t. Furthermore, all arsenic has been eliminated. Melting of the leaching residue is therefore much less expensive in comparison with melting of the original concentrate. Even if roasted prior to the melting process, the quantity would not be reduced to any great extent, since the iron remains in the roasted product and because oxygen takes the place of sulphur.

EXAMPLE 3

A complex copper concentrate having the following principle composition: 20% Cu, 7% As, 2% Sb, 30% Fe, 35% S and 90 g Au/tonne was processed. Subsequent to subjecting the concentrate to a bacteria leaching process and copper cementation, there was obtained a leaching residue that comprised 40% Cu, 20% Fe, 20% S and 155 g Au/tonne and less than 1.4% As and less than 0.5% Sb. Thus, the amount of leaching residue obtained was less than about 50% of the amount of concentrate processed and the amounts of impurities present were less than 10% of the impurities contained by the original concentrate. This leaching residue can be melted in a conventional manner for the recovery of metal.

In summary, the invention can be said to afford the following advantages:

Higher yields of valuable metal contents in comparison with methods known hitherto.

Less expensive and a more environmentally acceptable pre-processing than when working-up materials in accordance with conventional pyrometallurgical processes.

Less costly pre-processing than when working-up materials according to the known conventional hydrometallurgical processes, because the degree of oxidation need not necessarily be 95–100%.

Generally usable for metal sulphide material which would otherwise need to be processed in separate ways.

An enriched product is obtained for the subsequent melting stage, by the specific pre-processing of recoverable metals.

We claim:

1. A process for the treatment of a complex metal sulphide material comprising subjecting the material to an oxidizing leaching process in an acid environment and under conditions so as to promote oxidation of iron and sulphur, oxidizing sulphide sulphur at least partially to sulphate whereby oxidized iron and impurities pass into solution wherein the leaching process is conducted over a period of time so that at most 80% of the sulphide sulphur content of the material is oxidized, whereby a leaching residue is formed which is suitable for pyrometallurgical recovery of the metal values and which contains the major portion of the metal values that were present in the complex metal sulphide material.

2. The process of claim 1 wherein the oxidizing leaching process is conducted with the aid of bacteria capable of promoting the oxidation of sulphur and iron.

3. The process of claim 1 wherein the oxidizing leaching process is conducted over a period of time so that 75–80% of the sulphide sulphur content is oxidized.

4. The process of claim 3 wherein valuable metals are precipitated and separated from the leaching solution.

5. The process of claim 4 wherein the pyrometallurgical recovery of metal values is conducted in a copper smelting process and other non-leached processed material is simultaneously processed for recovering said metal values.

6. The process of claim 5 wherein the complex metal sulphide material is refractory material containing precious metals.

7. The process of claim 5 wherein the complex metal sulphide material is selected from the group consisting of complex copper concentrate and complex nickel concentrate.

8. The process of claim 1 wherein valuable metals are precipitated and separated from the leaching solution.

9. The process of claim 2 wherein the pyrometallurgical recovery of metal values is conducted in a copper smelting process and other non-leached processed material is simultaneously processed for recovering said metal values.

10. The process of claim 3 wherein the complex metal sulphide material is refractory material containing precious metals.

11. The process of claim 4 wherein the complex metal sulphide material is selected from the group consisting of complex copper concentrate and complex nickel concentrate.

12. A melt material product for the pyrometallurgical recovery of nonferrous metals obtained by the method of claim 1.

13. A process for recovering metal values from a metal sulphide material comprising first subjecting the material to a leaching process in an acid environment under conditions such that sulphide sulphur is oxidized to sulphate and such that oxidized iron and impurities will pass into solution and leaving the major portion of the metal values unchanged, and by then melting the leaching residue to recover the metal values by a pyrometallurgical process.

14. The process of claim 13 wherein the leaching process is conducted over a period of time so that 75-80% of the sulphide sulphur content is oxidized.

15. The process of claim 14 wherein valuable metals are precipitated and separated from the leaching solution.

16. The process of claim 15 wherein the pyrometallurgical recovery of metal values is conducted in a copper smelting process.

17. The process of claim 16 wherein the complex metal sulphide material is refractory material containing precious metals.

18. The process of claim 16 wherein the complex metal sulphide material is selected from the group consisting of complex copper concentrate and complex nickel concentrate.

19. The process of claim 13 wherein valuable metals are precipitated and separated from the leaching solution.

20. The process of claim 13 wherein the pyrometallurgical recovery of metal values is conducted in a copper smelting process and other non-leached processed material is simultaneously processed for recovering said metal values.

21. The process of claim 13 wherein the complex metal sulphide material is refractory material containing precious metals.

22. The process of claim 19 wherein the complex metal sulphide material is selected from the group consisting of complex copper concentrate and complex nickel concentrate.

* * * * *

UNITED STATES PATENT AND TRADEMARK OFFICE
CERTIFICATE OF CORRECTION

PATENT NO. : 5,397,380

DATED: : March 14, 1995

INVENTOR(S) : Stig Arvid PETERSSON et al

It is certified that error appears in the above-identified patent and that said Letters Patent is hereby corrected as shown below:

On the title page, item [30] insert:

June 19, 1991 [SE] Sweden    9101893-7

Signed and Sealed this

Twenty-fifth Day of July, 1995

Attest:

BRUCE LEHMAN

*Attesting Officer*    *Commissioner of Patents and Trademarks*